US012596917B2

(12) United States Patent
Gong et al.

(10) Patent No.: US 12,596,917 B2
(45) Date of Patent: Apr. 7, 2026

(54) OPTIMIZING LOW PRECISION INFERENCE MODELS FOR DEPLOYMENT OF DEEP NEURAL NETWORKS

(71) Applicant: Intel Corporation, Santa Clara, CA (US)

(72) Inventors: Jiong Gong, Shanghai (CN); Yong Wu, Shanghai (CN); Haihao Shen, Shanghai (CN); Xiao Dong Lin, Shanghai (CN); Guoming Zhang, Shanghai (CN); Feng Yuan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 17/929,023

(22) PCT Filed: Mar. 13, 2020

(86) PCT No.: PCT/CN2020/079161
§ 371 (c)(1),
(2) Date: Aug. 10, 2022

(87) PCT Pub. No.: WO2021/179281
PCT Pub. Date: Sep. 16, 2021

(65) Prior Publication Data
US 2023/0118802 A1      Apr. 20, 2023

(51) Int. Cl.
*G06N 3/0495* (2023.01)
*G06N 3/08* (2023.01)

(52) U.S. Cl.
CPC ............. *G06N 3/0495* (2023.01); *G06N 3/08* (2013.01)

(58) Field of Classification Search
CPC ........ G06N 3/0495; G06N 3/08; G06N 3/045; G06N 3/063
See application file for complete search history.

(56) References Cited

U.S. PATENT DOCUMENTS 10,740,432 B1 *   8/2020   Diamant ................ G06N 3/045
2018/0217807 A1 *   8/2018   Duewer .................. G06F 3/162
(Continued)

FOREIGN PATENT DOCUMENTS

CN      107292382 A    10/2017
CN      107657314 A    2/2018
(Continued)

OTHER PUBLICATIONS

Intel Corporation, "Accelerate Deep Learning Inference with Integrated Intel Processor Graphics Rev 2.0," May 29, 2018, 21 pages.
(Continued)

*Primary Examiner* — Miranda M Huang
(74) *Attorney, Agent, or Firm* — Nicholson De Vos Webster & Elliott LLP

(57)      ABSTRACT

Systems, apparatuses and methods may provide technology for optimizing an inference neural network model that performs asymmetric quantization by generating a quantized neural network, wherein model weights of the neural network are quantized as signed integer values, and wherein an input layer of the neural network is configured to quantize input values as unsigned integer values, generating a weights accumulation table based on the quantized model weights and a kernel size for the neural network, and generating an output restoration function for an output layer of the neural network based on the weights accumulation table and the kernel size. The technology may also perform per-input channel quantization. The technology may also perform mixed-precision auto-tuning.

25 Claims, 11 Drawing Sheets

(56) References Cited

U.S. PATENT DOCUMENTS

| | | | | |
|---|---|---|---|---|
| 2019/0243610 A1* | 8/2019 | Lin | .......................... | G06N 3/08 |
| 2020/0234112 A1* | 7/2020 | Wang | ....................... | G06N 3/08 |
| 2020/0234126 A1* | 7/2020 | Covell | ...................... | G06F 1/03 |
| 2020/0364552 A1* | 11/2020 | Guo | ........................ | H03M 7/24 |
| 2021/0264279 A1* | 8/2021 | Esser | ..................... | G06F 17/16 |
| 2021/0287095 A1* | 9/2021 | Lin | ....................... | G06F 7/5443 |

FOREIGN PATENT DOCUMENTS

| | | |
|---|---|---|
| CN | 109508784 A | 3/2019 |
| CN | 110503182 A | 11/2019 |
| EP | 3438890 A1 | 2/2019 |
| WO | 2018171900 A1 | 9/2018 |

OTHER PUBLICATIONS

A. Rodriguez et al., "Lower Numberical Precision Deep Learning Inference and Training," Jan. 2018, 19 pages.

International Search Report and Written Opinion for International Patent Application No. PCT/CN2020/079161, mailed Dec. 10, 2020, 9 pages.

J. Gong et al., "Highly Efficient 8-bit Low Precision Inference of Convolutional Neural Networks with Intel Caffe," May 4, 2018, 4 pages, arXiv preprint arXiv:1805.08691v1.

J. Lee et al., "Quantization for Rapid Deployment of Deep Neural Networks," Oct. 12, 2018, 9 pages, arXiv preprint arXiv:1810.05488v1.

V. Reddi et al., "MLPerf Inference Benchmark," Nov. 6, 2019, 23 pages, arXiv preprint arXiv:1911.02549v1.

International Preliminary Report on Patentability, PCT App. No. PCT/CN2020/079161, Sep. 22, 2022, 05 pages.

International Search Report and Written Opinion, PCT App. No. PCT/CN2020/079161, Dec. 10, 2020, 06 pages.

* cited by examiner

Generate a quantized neural network, wherein model weights of the neural network are quantized as signed integer values, and wherein an input layer of the neural network is configured to quantize input values as unsigned integer values

714

Generate a weights accumulation table based on the quantized model weights and a kernel size for the neural network

716

Generate an output restoration function for an output layer based on the weights accumulation table and the kernel size

722

Generate a mapping between output coordinates for the output layer and indices for the weights accumulation table

B

C

B

732

Quantize input values on a per-channel basis

734

Quantize model weights of the neural network on a per-channel basis

C

C

742

Perform auto-tuning procedure

FIG. 7

OPTIMIZING LOW PRECISION INFERENCE MODELS FOR DEPLOYMENT OF DEEP NEURAL NETWORKS

CROSS REFERENCE TO RELATED APPLICATIONS

The present application is a U.S. National Phase Patent Application, which claims the benefit of priority to International Patent Application No. PCT/CN2020/079161 filed on Mar. 13, 2020.

TECHNICAL FIELD

Embodiments generally relate to machine learning. More particularly, embodiments relate to optimizing neural network technology for deployment in industrial, commercial and consumer applications.

BACKGROUND

Recent developments in machine learning (ML) technology, in particular neural networks, have shown promise for application to a wide range of computation tasks.

Neural networks such as deep neural networks may involve complex matrix-based multiplication and convolution operations. Once trained, neural networks may be deployed as an inference neural network model. However, the high computational complexity of Deep Neural Networks (and other neural networks) provides challenges for deployment of inference models in industrial, commercial and/or consumer applications. Low-precision inference models have been considered but lack suitable accuracy and/or have excessive memory or bandwidth requirements.

BRIEF DESCRIPTION OF THE DRAWINGS

The various advantages of the embodiments will become apparent to one skilled in the art by reading the following specification and appended claims, and by referencing the following drawings, in which:

FIGS. 2A-2C provide diagrams illustrating aspects of asymmetric quantization according to one or more embodiments;

FIG. 7 provides a flowchart illustrating a process for optimizing an inference neural network model according to one or more embodiments;

DESCRIPTION OF EMBODIMENTS

Applications such as image recognition and natural language processing (NLP) may use deep learning technology, a subset of artificial intelligence (AI) machine learning, where a neural network such as a deep neural network (DNN) contains multiple intermediate layers to conduct complex operations on input data. Due to the relatively large amounts of data involved in deep neural networks, the data may typically be organized and processed as n-dimensional arrays (e.g., tensors), which may be further partitioned into matrices. In such a case, common matrix operations may include matrix multiplication operations (e.g., "matmul" via a General Matrix Multiply/GEMM kernel), convolution operations (e.g., via a convolution kernel), and so forth. An inference neural network model may include low-precision quantization, as discussed below, and provide suitably optimized performance for deployment.

Figure 1:
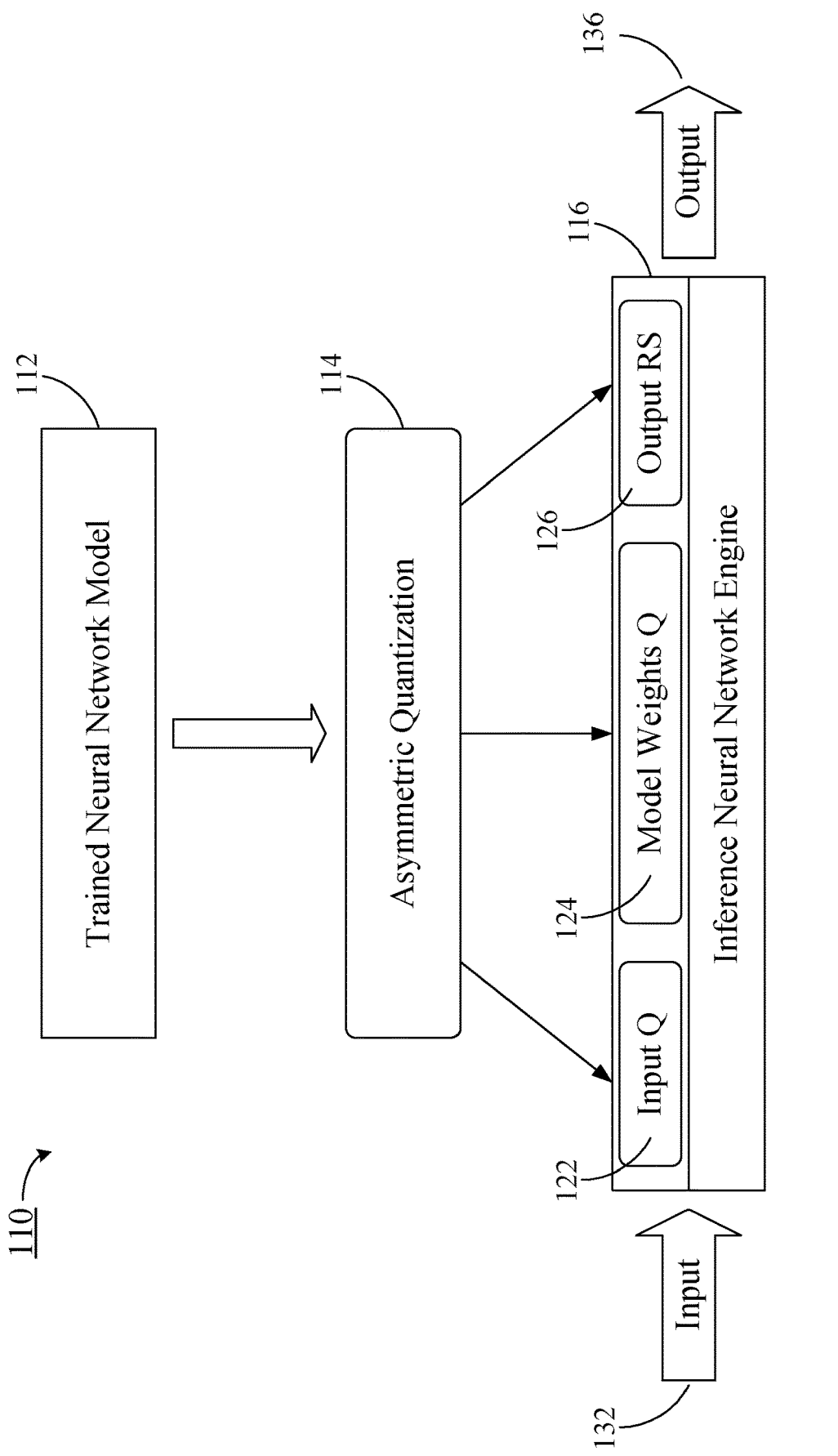
FIG. 1 provides a diagram illustrating a system for optimizing an inference neural network model according to one or more embodiments.

FIG. 1 shows a block diagram of an example system 110 for optimizing an inference neural network model using asymmetric quantization, according to one or more embodiments, with reference to components and features described herein including but not limited to the figures and associated description. System 110 may include trained neural network model 112, asymmetric quantization module 114, and inference neural network engine 116. Trained neural network model 112 may be a deep neural network, and may be trained according to neural network training procedures known to those of skill in the art. Trained neural network model 112 may typically include an input layer or stage for handling input tensors or other input data, intermediate layers including weights for computing operations such as, e.g., convolution operations or matrix multiply operations, and an output layer or stage for handling or presenting output data.

Asymmetric quantization module 114 may carry out one or more processes for optimizing an inference neural network model, such as an inference model implemented in inference neural network engine 116, based on trained neural network model 112. Inference neural network engine 116 may receive input tensors or other input data 132, carry out computations or other operations according to an inference model (based on the trained model), and provide output tensors or other output data 136. Inference neural network engine 116 may include input layer quantization 122, model weights quantization 124, and output layer restoration 126. Input tensors or other input data 132 may be received as relatively high-precision values (such as floating point values or high-precision integer values). Similarly, output tensors or other output data 136 may be relatively high-precision values (such as floating point values or high-precision integer values). Floating point values may be, for example, 64-bit floating point values (fp64) or 32-bit floating point values (fp32); high-precision integer values may be, for example, 64-bit or 32-bit integer values (int64 or int32).

Input tensors or other input data 132, received as relatively high-precision values, may be quantized by input layer quantization 122 into low-precision integer values such as, for example, 8-bit integer values (int8). The inference model may carry out computations or other operations, such as matrix multiplication operations and/or convolution operations, where the weights for the applicable kernel (such as GEMM or convolution kernel) have been quantized via model weights quantization 124 into low-precision weights such as, for example, 8-bit integer values (int8). Output layer restoration 126 handles converting lower-precision integer output values back into high-precision (e.g., floating point) output values.

Asymmetric quantization module 114 controls how input layer quantization 122, model weights quantization 124, and output layer restoration 126 are implemented or carried out. Input layer quantization 122 may be implemented by quantizing input values using asymmetric quantization, such that each high precision input value (e.g., fp32) is quantized into an unsigned integer value (e.g., uint8), according to the formula:

$$x_{uint8}=S_x*(x_{fp32}+z) \qquad (1)$$

where $x_{uint8}$ is the quantized integer input value, $S_x$ is an input scale factor, $x_{fp32}$ is the floating point input value, and z is a bias or offset. A rounding function may be applied to round up or down to the nearest integer value. For example, the input scale factor $S_x$ and bias z may be set, based on the dynamic range of the input values $x_{fp32}$, such that the quantized uint8 values fit within the range 0 to 255:

$$S_x = \frac{255}{\text{Max}_{fp32} - \text{Min}_{fp32}}; \text{and } z_{fp32} = -\text{Min}_{fp32} \qquad (2)$$

where $\text{Min}_{fp32}$ and $\text{Max}_{fp32}$ are the minimum and maximum input (floating point) values, respectively. In some embodiments, the input scale factor $S_x$ and bias z may be set according to other criteria.

Model weights quantization 124 may be implemented by quantizing floating point weights using symmetric quantization, such that each high precision weight value (e.g., fp32) is quantized into a signed integer value (e.g., int8), according to the formula:

$$w_{int8}=S_w*w_{fp32}. \qquad (3)$$

where $w_{int8}$ is the quantized integer weight value, $S_w$ is a weight scale factor, and $w_{fp32}$ is the floating point weight value. A rounding function may be applied to round up or down to the nearest integer value. For example, the weight scale factor $S_w$ may be set, based on the dynamic range of the weight values $w_{fp32}$, such that the quantized int8 values fit within the range −128 to +127. Model weights quantization 124 may be performed once when the inference model is established.

Output values may be calculated according to the inference model. For example, the inference model may carry out convolution operations, via a convolution kernel W, according to the formula:

$$y_{int32}=\text{conv}(x_{uint8},w_{int8}) \qquad (4)$$

where $y_{int32}$ (e.g., 32-bit integer) is the integer output value, and conv (x, W) represents a convolution operation involving input values x and kernel weights W. As an example, the input values x may represent a two-dimensional (2D) data set (e.g., an image) and the kernel W may represent a two-dimensional (2D) set of weights.

Figures 2A, 2B, 2C:
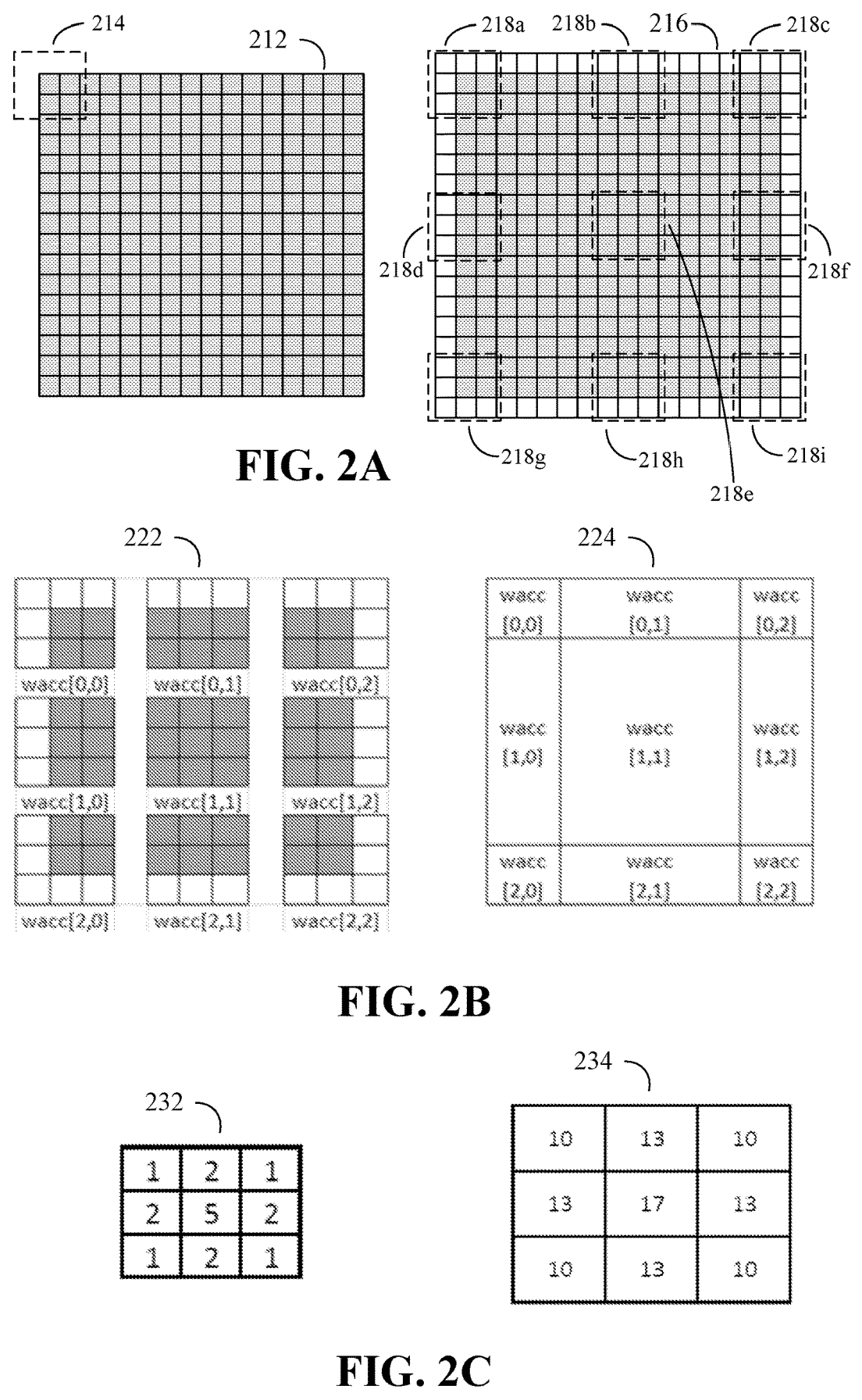

Further details relating to aspects of asymmetric quantization are illustrated in and described below with reference to FIGS. 2A-2C. Shown in FIG. 2A is a diagram illustrating padding as used in convolution operations according to one or more embodiments, with reference to components and features described herein including but not limited to the figures and associated description. For convolution operations, the input data set may be padded (e.g., around the outer borders) with values to accommodate the convolution operations involving the kernel for input values along the outer borders. FIG. 2A depicts a two-dimensional input data set 212, which could represent, for example, an image. Data set 212 is shown for illustration purposes as a 16×16 set of data values (e.g., pixels), but the dimensions for the data set could be of any size (and the dimensions do not need to be of equal size, but could be, e.g., 32×64). A box 214 shows the outline for a kernel that may be used in convolution operations; the kernel size is shown for illustration purposes as a 3×3 kernel, but the kernel could be of any size (and the kernel dimensions do not need to be of equal size, but could be, e.g., 5×7).

As shown in FIG. 2A, when the kernel is centered over the upper left data value, there are kernel values that do not overlap any input values. Thus, to carry out the convolution operations these values are added as "padding" as shown in FIG. 2A, which depicts the two-dimensional input data with padding 216. Padded data set 216 is shown as a series of additional data elements (e.g., pixels) surrounding the outer border rows and columns of data set 212. The number of padded rows and columns is dependent upon the size of the kernel. For the example of a 3×3 kernel, a single padded row is added to the top and to the bottom of the two-dimensional data set 212, and a single padded column is added to each side of the two-dimensional data set 212. The padded values may be set to zero, or may be set to a constant value, etc. For the inference engine as described herein, padded values may be typically set to zero. Examples of how a 3×3 kernel may overlay padded data set 216 are shown in FIG. 2A as a series of boxes 218a-218i. More generally, the number of rows or columns to be added as padding along each border of the input is equal to trunc(K/2), where K is the kernel size and trunc( ) represents truncation of the result (e.g., for a 3×3 kernel, K=3).

Once all convolution and/or other computational operations for the inference model are completed, the output values may be converted (i.e., de-quantized) to restore to high-precision (e.g., floating point) values. Through asymmetric quantization module 114, output layer restoration 126 may be implemented as a restoration function by converting integer output values to high precision output values (e.g., fp32) according to the formula:

$$y_{fp32}=S_x*S_w*[y_{int32}-z*W_{acc}] \qquad (5)$$

where $y_{fp32}$ is the high-precision floating point output value, $y_{int32}$ is the integer value output from the inference model, $S_x$ and $S_w$ are the input and weights scaling factors, respectively, and $W_{acc}$ is a weights accumulation table. Weights accumulation table $W_{acc}$, is defined as:

$$W_{acc} = \sum_{i=kh_{start}, j=kw_{start}}^{i=kh_{end}, j=kw_{end}} W_{int8} \qquad (6A)$$

where $w_{int8}$ is the set of integer kernel weights within the range of applicable kernel indices $i=(kh_{start}, kh_{end})$ and $j=(kw_{start}, kw_{end})$.

FIG. 2B illustrates a weights accumulation table ($W_{acc}$) 222 according to one or more embodiments, with reference to components and features described herein including but not limited to the figures and associated description. As illustrated, weights accumulation table 222 corresponds to, as an example, a 3×3 kernel, unit stride, where a single row of padding is added around the border rows/columns of an input data set (as shown, e.g., as padded data set 216 in FIG. 2A). Unit stride means that, during convolution, the kernel is shifted by a single index value at a time.

As shown in FIG. 2B, the upper left-hand element of $W_{acc}$ 222, wacc[0,0], corresponds to the kernel as overlaid via box 218*a* in FIG. 2A. Moving to the right, the next element of $W_{acc}$ 222, wacc[0,1] corresponds to the kernel as overlaid via box 218*b*, and the next element of $W_{acc}$ 222, wacc[0,2] corresponds to the kernel as overlaid via box 218*c*. Similarly, element wacc[1,0] of Wace 222 corresponds to the kernel as overlaid via box 218*d*, element wacc[1,1] corresponds to the kernel as overlaid via box 218*e*, element wacc[1,2] corresponds to the kernel as overlaid via box 218*f*, and moving to the bottom of the weights accumulation table, element wacc[2,0] corresponds to the kernel as overlaid via box 218*g*, element wacc[2,1] corresponds to the kernel as overlaid via box 218*h*, and element wacc[2,2] corresponds to the kernel as overlaid via box 218*i*. It will be understood that $W_{acc}$ values wacc[0,0], wacc[0,2], wacc[2,0] and wacc [2,2] each correspond to a single point in the convolution, where the kernel is centered over one of the respective corner input values). It will be further understood that $W_{acc}$ value wacc[0,1] corresponds to points in the convolution where the kernel is centered over the top row of the input values (other than a corner value), wacc[2,1] corresponds to points in the convolution where the kernel is centered over the bottom row of the input values (other than a corner value), wacc[1,0] corresponds to points in the convolution where the kernel is centered over the left-most column of the input values (other than a corner value), and wacc[1,2] corresponds to points in the convolution where the kernel is centered over the right-most column of the input values (other than a corner value). Finally, it will be understood that $W_{acc}$ value wacc[1,1] corresponds to points in the convolution where the kernel is centered over any of the input values other than a border value. Coordinates of the output layer may correspond to coordinates of the input layer (i.e., input data set) without padding. A mapping of the output coordinates of the output layer to the indices for the weights accumulation table may be generated (e.g., to reflect the application of values of the weights accumulation table to coordinates of the data set as described above), based on the kernel size, stride, and size (e.g., dimensions) of the output data set, to enable rapid computation of the high-precision output values $y_{fp32}$ according to equation 5. Arrangement of the values of weights accumulation table 222 is shown in table 224, where the location of the individual table elements roughly corresponds to the mapping to the respective output coordinates. Using a weights accumulation table as described above and with reference to FIG. 2B permits computations involving padded data elements to be effectively ignored, resulting in further efficiency and speed in performing the computations.

Each entry in weights accumulation table 222, per equation (6) above, is computed as the sum of the individual kernel weights corresponding to the individual boxes of each element of $W_{acc}$ 222 shown in grey. For example, wacc[0,0] is the sum of the 4 kernel weights shown in grey, wacc[0,1] is the sum of the 6 kernel weights shown in grey, wacc[1,1] is the sum of all 9 kernel weights shown in grey, etc. FIG. 2C illustrates an example of a weights accumulation table 234 for an example 3×3 kernel 232 with weights ranging from 1 to 5, and the corresponding values for weights accumulation table 234 are computed based on the values of kernel 232. For example, the value wacc[1,1] is the sum of all weights in the kernel, which for the example kernel 232 is 17, as shown in the corresponding weights accumulation table 234 (center value is wacc[1,1]).

As shown by the figures and examples described above with reference to FIGS. 2A-2C, a 3×3 kernel size results in a weights accumulation table with 9 elements. In the case of a kernel size of 5×5, for example, the corresponding weights accumulation table would include 25 elements. In those cases where the stride is longer than a unit stride, the weights accumulation table values and the mapping from output coordinates to the indices for the weights accumulation table may be adjusted accordingly.

In some embodiments, the inference model may have multiple inner levels, such as, e.g., multiple convolution levels, with a different kernel used for each level. In such cases, each level may have a separate per-level weights accumulation table, and an aggregated weights accumulation table (to be used for computing the output values) may be constructed by adding the individual elements of each of the per-level weights accumulation tables. For example, the elements of the aggregated weights accumulation table may be computed as:

$$W_{acc}(i, j) = \sum_{n=1}^{L} W_n(i, j) \tag{6B}$$

where $W_n(\ )$ is the per-level weights accumulation table for level n, L is the total number of inner levels, and (i,j) are the indices for each of the per-level weights accumulation tables. Each per-level weights accumulation table $W_n(\ )$ may be computed, for example, as set forth in equation 6A above.

Figure 3A:
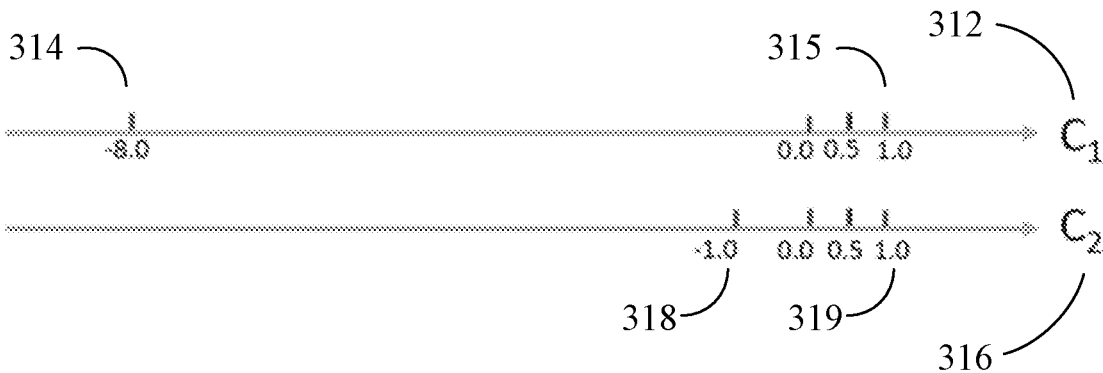
FIGS. 3A-3B provide diagrams illustrating aspects of per-input channel quantization according to one or more embodiments.

More generally, where the input is a tensor with multiple channels, the corresponding weights accumulation table would have an additional dimension, such that the weights accumulation table would have set of entries in tiers extending in the additional dimension, one tier corresponding to each channel. For example: if the input tensor is an image with color values, having 3 channels such as a red channel, a green channel and a blue channel, and if the kernel size is 5×5 (unit stride), the corresponding weights accumulation table would be a 5×5×3 matrix, such that the weights accumulation table would have 3 sets (or tiers) of 5×5 entries in the additional matrix dimension (here, a third dimension), where one set (or tier) of 5×5 entries would correspond to each channel.

Where the input is a multi-channel tensor, in some embodiments additional optimization of an inference engine may be performed by accounting, on a per-channel basis, for the relative dynamic range of input values for each channel. Shown in FIG. 3A is a graph depicting, for an example tensor with two input channels $C_1$ (label 312) and $C_2$ (label 316), the range of values for each input channel. As shown in the example, input values for input channel $C_1$ range from −8.0 (label 314) to +1.0 (label 315), and input values for input channel $C_2$ range from −1.0 (label 318) to +1.0 (label 319). If the input quantization described above with reference to FIGS. 1, 2A-2C is used, the two channels would have the same scale factor and same bias applied, such that the quantization for one of the channels may be compressed or imbalanced relative to the other channel. However, the dynamic range of each channel may be accounted for by performing per-input channel quantization, where the quantization is computed individually for each input channel, resulting in an increase in precision.

Figure 4:
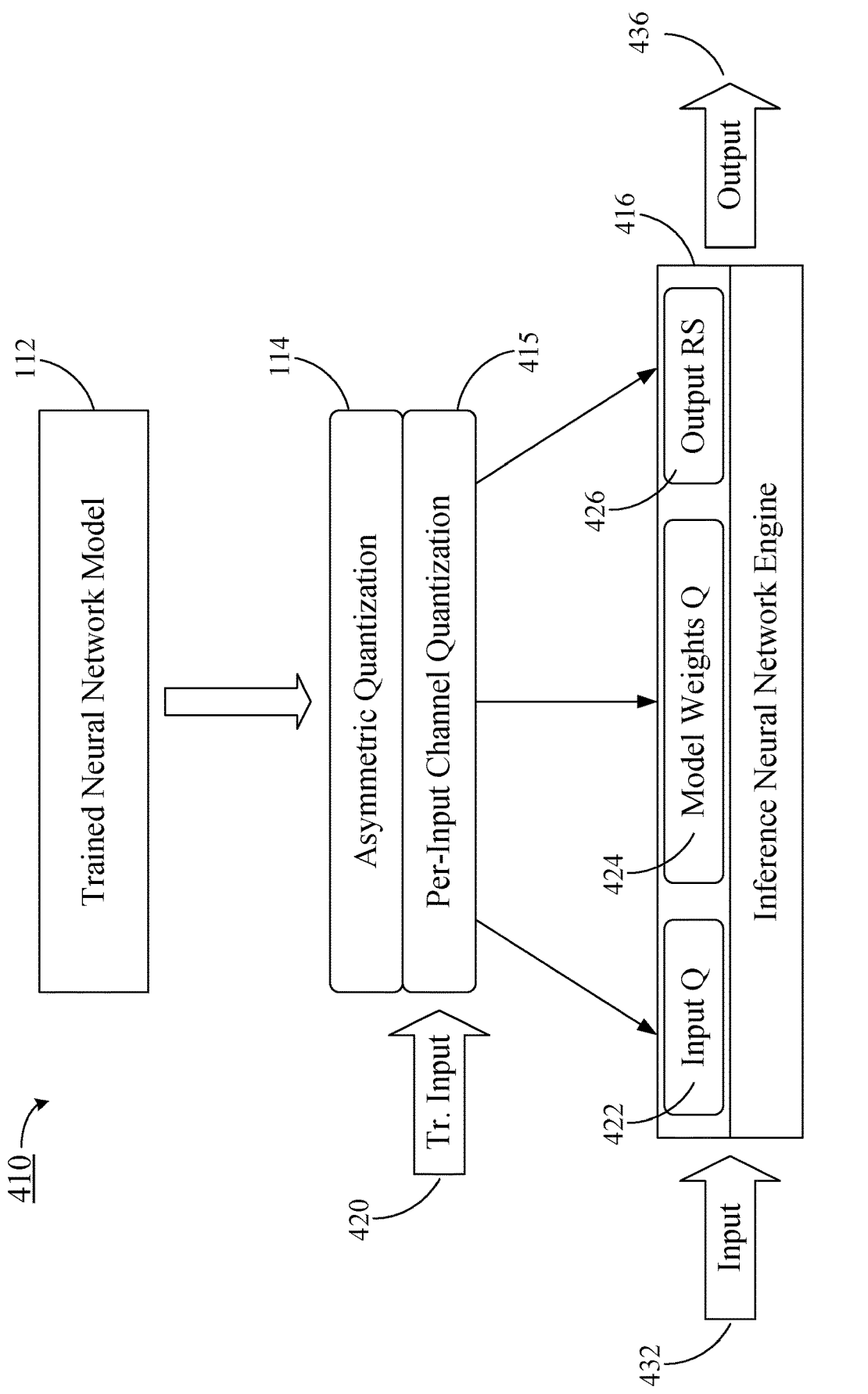
FIG. 4 provides a diagram illustrating a system for optimizing an inference neural network model according to one or more embodiments.

FIG. 4 shows a block diagram of an example system 410 for optimizing an inference neural network model using asymmetric quantization combined with per-input channel quantization, according to one or more embodiments, with reference to components and features described herein including but not limited to the figures and associated description. System 410 may include trained neural network model 112 (as described above), asymmetric quantization module 114 (as described above), per-input channel quantization module 415, and inference neural network engine 416. Per-input channel quantization module 415 may, in combination with asymmetric quantization module 114, carry out one or more processes for optimizing an inference neural network model, such as an inference model implemented in inference neural network engine 416, based on trained neural network model 112. Inference neural network engine 416 may receive multi-channel input tensors or other multi-channel input data 432, carry out computations or other operations according to an inference model (based on the trained model), and provide output tensors or other output data 436. Inference neural network engine 416 may include input layer quantization 422, model weights quantization 424, and output layer restoration 426. Input tensors or other input data 432 may be received as relatively high-precision values (such as floating point values or high-precision integer values). Similarly, output tensors or other output data 436 may be relatively high-precision values (such as floating point values or high-precision integer values). Floating point values may be, for example, 64-bit floating point values (fp64) or 32-bit floating point values (fp32); high-precision integer values may be, for example, 64-bit or 32-bit integer values (int64 or int32).

Input tensors or other input data 432, received as relatively high-precision values, may be quantized on a per-channel basis by input layer quantization 422 into low-precision integer values such as, for example, 8-bit integer values (int8). The inference model may carry out computations or other operations, such as matrix multiplication operations and/or convolution operations, where the weights for the applicable kernel (such as GEMM or convolution kernel) have been quantized via model weights quantization 424 into low-precision weights such as, for example, 8-bit integer values (int8). Output layer restoration 426 handles converting lower-precision integer output values back into high-precision (e.g., floating point) output values (e.g., floating point).

Asymmetric quantization module 114 in combination with per-input channel quantization module 415 controls how input layer quantization 422, model weights quantization 424, and output layer restoration 426 are implemented or carried out. Input layer quantization 422 may be implemented by quantizing input values on a per-channel basis using asymmetric quantization, such that each high precision input value (e.g., fp32) is quantized into an unsigned integer value (e.g., uint8), according to the formula:

$$x_{uint8_c} = \text{Round}(S_{x_c} * (x_{fp32_c} + z_{fp32_c})) \tag{7}$$

here $x_{uint8_c}$ is the quantized integer input value for input channel c, $S_{x_c}$ is an input scale factor for input channel c, $x_{fp32_c}$ is the floating point input value for input channel c, and $z_{fp32_c}$ is a bias or offset for input channel c. A rounding function may be applied to round up or down to the nearest integer value. For each input channel c, the input scale factor $S_{x_c}$ and bias $z_{fp32_c}$ may be set, based on the dynamic range of the input values, $x_{fp32_c}$, for input such that the quantized uint8 values fit within the range 0-255:

$$S_{x_c} = \frac{255}{\text{Max}_{fp32_c} - \text{Min}_{fp32_c}}; \text{ and } z_{fp32_c} = -\text{Min}_{fp32_c} \tag{8}$$

where $\text{Min}_{fp32_c}$ and $\text{Max}_{fp32_c}$ are the minimum and maximum input (floating point) values, respectively, for input channel c. In some embodiments, the per-channel minimum and maximum input values $\text{Min}_{fp32_c}$ and $\text{Max}_{fp32_c}$ may be determined based on training input data 420, which may be data used to train the trained neural network model 112.

Figure 3B:
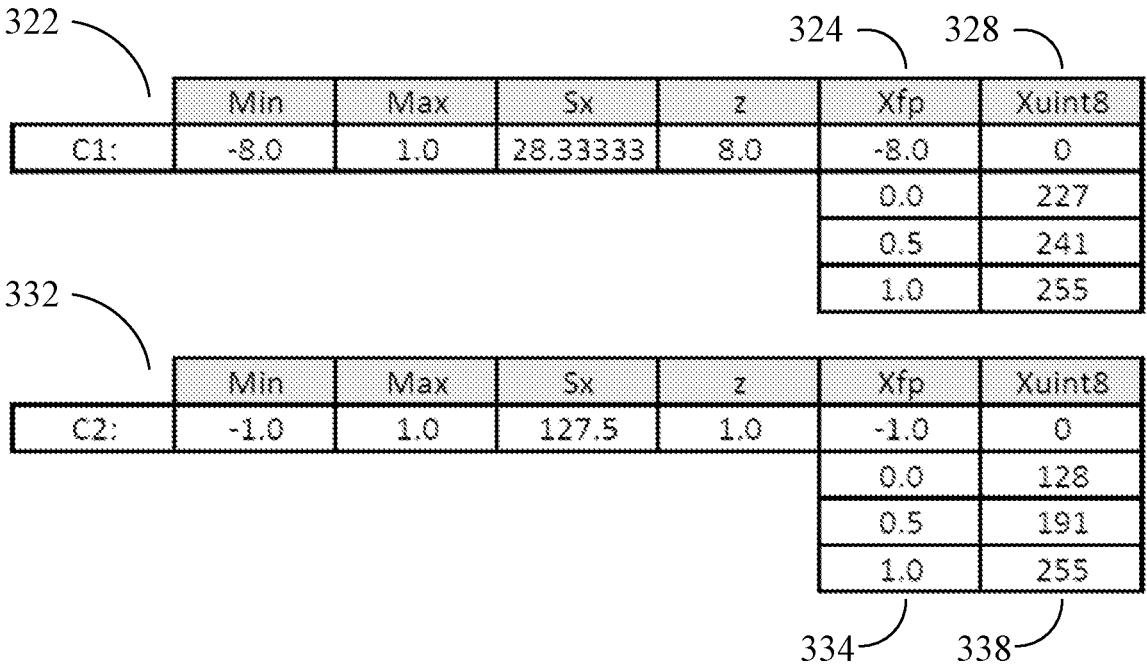

As an example, FIG. 3B shows quantized input values calculated on a per-channel basis, using the formulas in equations (7) and (8) above, for the input values reflected in FIG. 3A. For channel 1 (C1), as shown in FIG. 3A the minimum value 314 is (−8.0) and the maximum value 315 is +1.0. The scale factor, bias and quantized values are shown in FIG. 3B for channel C1 (chart 322). The column Xfp (label 324) shows the floating point input values, and the column Xuint8 (label 328) shows the corresponding quantized values, which range from 0 to 255. As shown in chart 322, for channel C1 the input value 0.0 is quantized as 227. For channel 2 (C2), as shown in FIG. 3A the minimum value 318 is (−1.0) and the maximum value 319 is +1.0. The scale factor, bias and quantized values are shown in FIG. 3B for channel C2 (chart 332). The column Xfp (label 334) shows the floating point input values, and the column Xuint8 (label 338) shows the corresponding quantized values, which range from 0 to 255. As shown in chart 332, for channel C2 the input value 0.0 is quantized as 128.

Returning to FIG. 4, model weights quantization 424 may be implemented by quantizing floating point weights on a per-channel basis using symmetric quantization, such that each high precision weight value (e.g., fp32) is quantized into a signed integer value (e.g., int8), according to the formula:

$$w_{int8_c} = \text{Round}(S_{w_c} * w_{fp32_c}) \tag{9}$$

where $w_{int8_c}$ is the quantized integer weight value for input channel c, $S_{w_c}$ is a weight scale factor for input channel c, and $w_{fp32_c}$ is the floating point weight value for input channel c. A rounding function may be applied to round up or down to the nearest integer value. Per-channel weight scale factor $S_{w_c}$ may be determined by:

$$S_{w_c} = \frac{S_{xw}}{S_{x_c}} \tag{10}$$

where $$S_{xw} = \min_c \left( \frac{127}{|w_{fp32_c}|} * S_{x_c} \right) \geq \frac{127}{|w_{fp32}|} * S_{x_c} = S_x \tag{11}$$

Thus, the per-channel weight scale factor $S_{w_c}$ may be calculated in a way to guarantee the result of multiplication can be accumulated along the input channel and the scale of the result is $S_{xw}$. As Equation 11 shows it is no smaller than the tensor-wise scale $S_x$, and therefore more optimal. Model weights quantization 424 may be performed once when the inference model is established.

As described above with reference to FIG. 1, output values may be calculated according to the inference model. For example, for each input channel, the inference model may carry out convolution operations, via a convolution kernel W, according to the formula:

$$y_{int32_c} = \text{conv}(x_{uint8_c}, w_{int8_c}) \tag{12}$$

where $y_{int32_c}$ (e.g., 32-bit integer) is the integer output value, and conv (x, W) represents a convolution operation involving input values x and kernel weights W for channel c. Once all convolution and/or other computational operations for the inference model are completed, the output values may be converted (i.e., de-quantized) to restore to high-precision (e.g., floating point) values. Through asymmetric quantization module 114 and per-input channel quantization module 415, output layer restoration 426 may be implemented as a restoration function by converting integer output values to high precision output values (e.g., fp32) according to the formula:

$$y_{fp32} = S_x \cdot S_w \cdot [y_{int32} - z \cdot W_{acc}] \tag{13}$$

where $y_{fp32}$ dis the high-precision floating point output value, $y_{int32}$ is the integer value output from the inference model, $S_x$ and $S_w$ are the input and weights scaling factors, respectively, and $W_{acc}$ is a multi-dimensional weights accumulation table having one tier per channel as described above.

Figure 5:
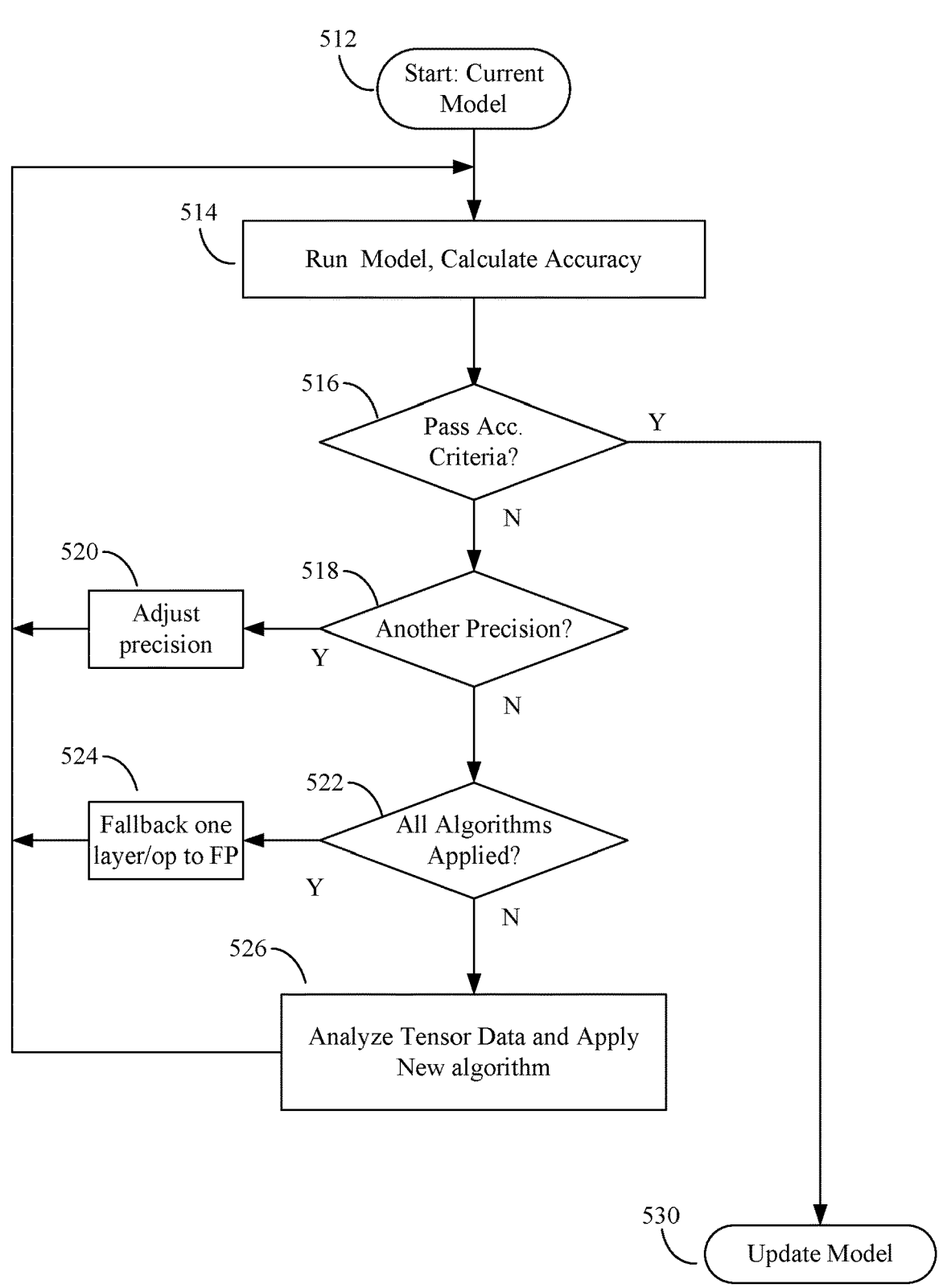
FIG. 5 provides a flowchart illustrating a process for tuning an inference neural network model according to one or more embodiments.

In some embodiments, additional optimization of the inference model may be accomplished through mixed-precision auto-tuning. FIG. 5 provides a flowchart illustrating a process 510 for tuning an inference neural network model according to one or more embodiments, with reference to components and features described herein including but not limited to the figures and associated description. Mixed-precision auto-tuning may be applied to an inference model as implemented in inference engine 116 (FIG. 1) or inference engine 416 (FIG. 4). The tuning process may include completing a series of test runs of the model to determine if model accuracy may be improved by making changes to precisions used in quantizing. The process begins (block 512) with a current state of the inference model. At block 514, the inference model is run and a determination of the accuracy of results is obtained. At block 516, the results are compared to accuracy criteria. Accuracy criteria may include, e.g., mean average precision (mAP). Other accuracy criteria may be used for the accuracy test of block 516, such as, for example, the optimal mean squared error (OMSE) process described below. If the accuracy of the results pass the accuracy criteria assessment, the process continues at block 530 (described below). If the accuracy of the results do not pass the accuracy criteria assessment of block 516, then the process proceeds to block 518.

At block 518, it is determined if another precision for inputs and/or weights is available for selection. For example, int16 quantization could be selected as an alternative for int8 quantization. As another example, the precision could be reverted back to floating point (such as fp 32 or fp16) as an alternative selection. If another precision is available for selection at block 518, the process proceeds to block 520, where the precision for the inference model is adjusted to the alternative selection and the process returns to block 514, where the model is run again, with the adjusted precision applied. If another precision is not available for selection at block 518 (for example, all possible alternative precisions have been attempted), the process proceeds to block 522. In some embodiments, determination of available precisions (block 518) and adjustment of precisions (block 520) may be performed on an algorithm-by-algorithm basis for the inference model; in such cases, once all available precision adjustments have been made for a particular algorithm, the process proceeds to block 522.

At block 522, it i710s determined if all algorithms (e.g., for a particular layer of the inference model) have been applied. If yes, the process proceeds to block 524, where another layer is selected and a precision is adjusted for that layer, and the process returns to block 514 where the model is run again, with the adjusted precision applied. In some embodiments, the tuning process may begin at the last layer and once all algorithms for that layer have been applied, the process may "fall back" to the previous layer and a precision may be adjusted, e.g., to fp32. If it is determined at block 522 that all algorithms have not been applied, the process proceeds to block 526.

At block 526, tensor data may be analyzed and a new algorithm applied. The new algorithm to be applied may be based on the kernel implementation or may be an alternative algorithm for the neural network model. The process then returns to block 514, where the model is run again, with the new algorithm applied.

At block 530, the process has continued from block 516, where the accuracy criteria assessment has been passed. Any adjustments that were made (e.g., adjustments to precision at block 520) may incorporated into an updated inference model, which may be implemented in an inference engine, and the tuning process 510 exits.

Figure 6A:
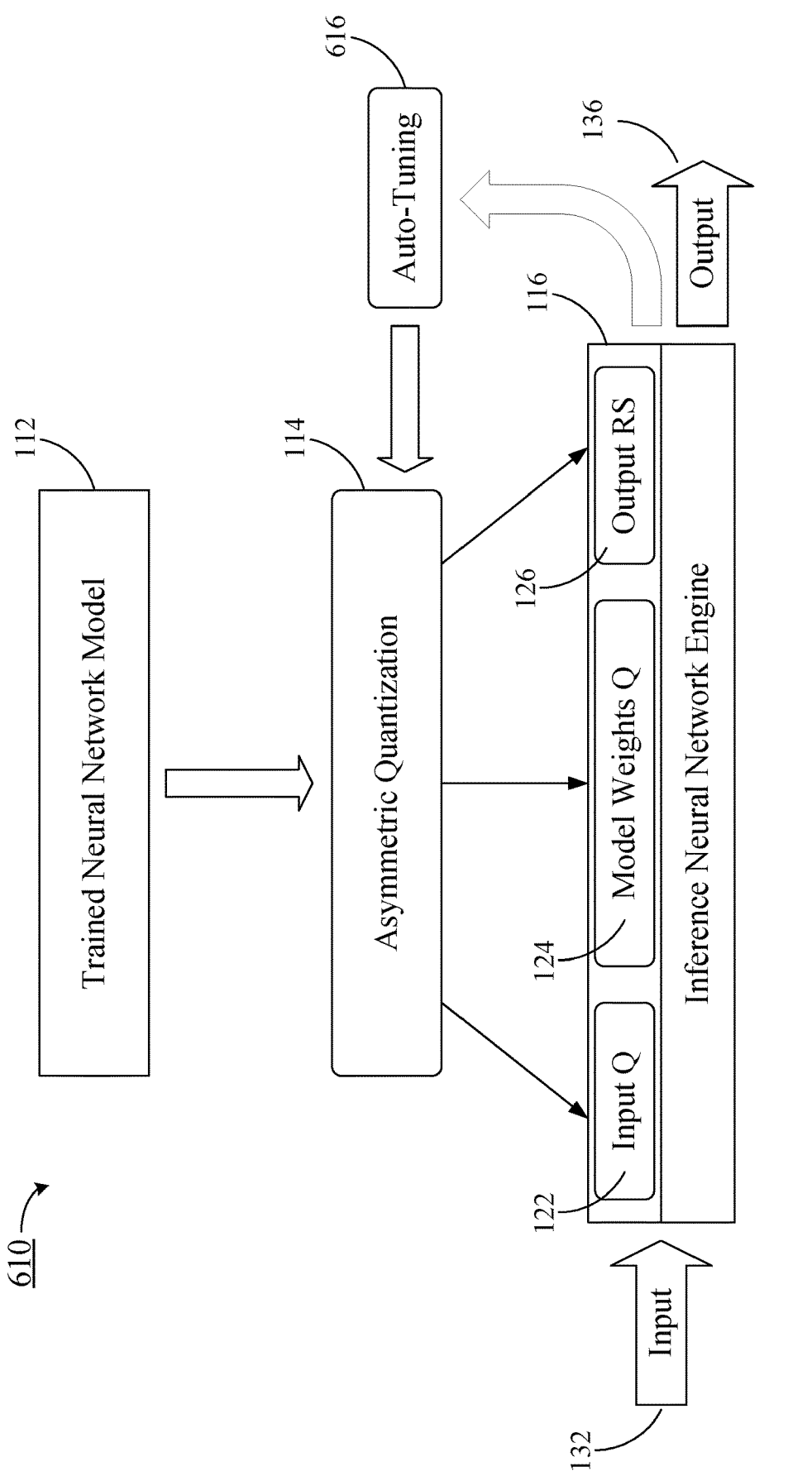
FIGS. 6A-6B provide diagrams illustrating systems for optimizing an inference neural network model according to one or more embodiments.
Figure 6B:
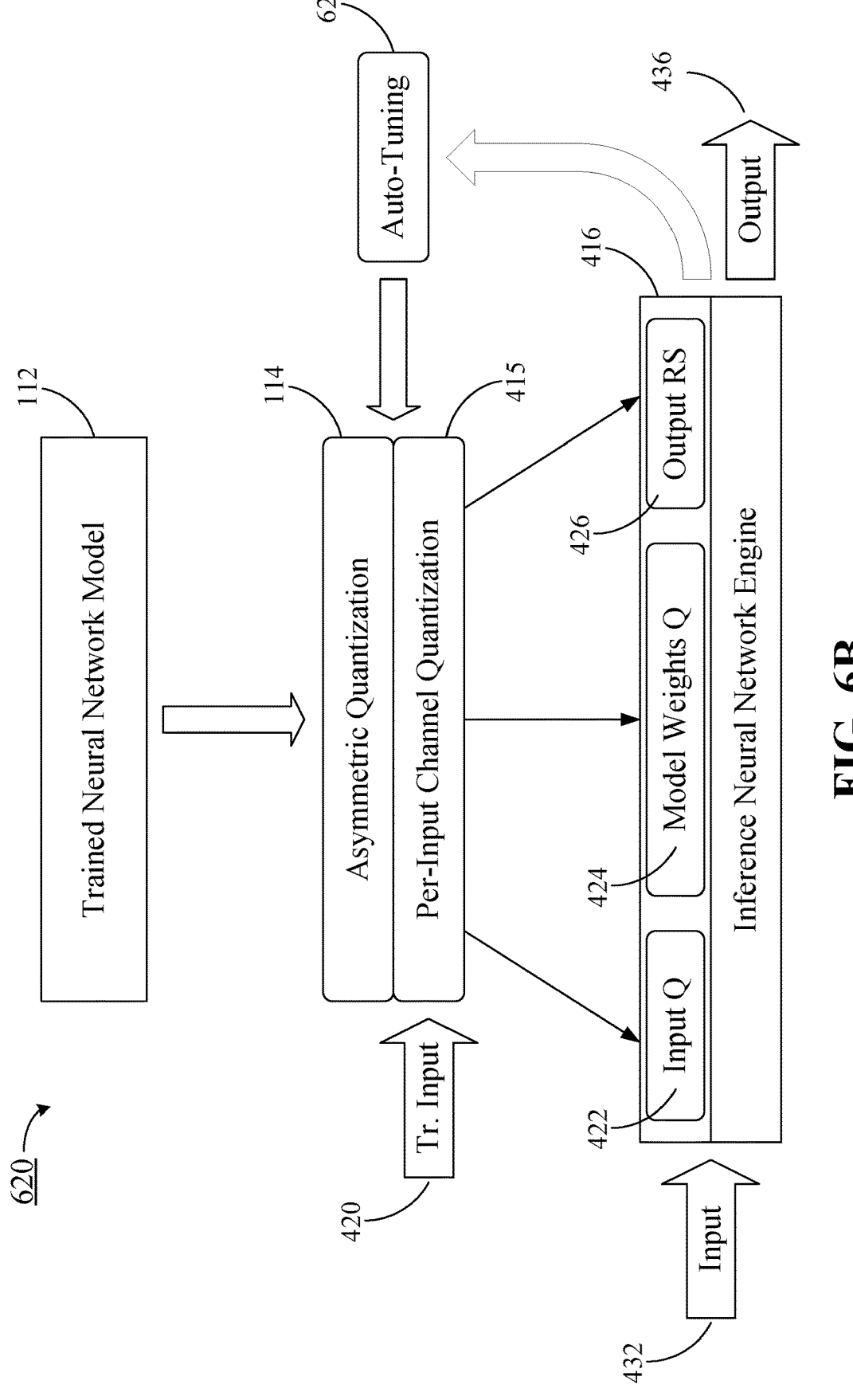

FIGS. 6A-6B illustrate alternative systems for inference neural network model optimization incorporating mixed-precision auto-tuning. FIG. 6A shows a block diagram of an example system 610 for optimizing an inference neural network model using asymmetric quantization and auto-tuning, according to one or more embodiments, with reference to components and features described herein including but not limited to the figures and associated description. FIG. 6A includes the optimization system as shown in and described above with reference to FIG. 1, and may include auto-tuning module 616. Auto-tuning module 616 may perform the auto-tuning process described above with reference to FIG. 5. Auto-tuning module 616 may receive data from inference engine 116, and may operate, in conjunction with asymmetric quantization module 114, to apply alternative precisions, etc. in running the tests, and in applying model updates once the testing is complete.

FIG. 6B shows a block diagram of an example system 620 for optimizing an inference neural network model using asymmetric quantization combined with per-input channel quantization and auto-tuning, according to one or more embodiments, with reference to components and features described herein including but not limited to the figures and associated description. FIG. 6B includes the optimization system as shown in and described above with reference to FIG. 4, and may include. auto-tuning module 626. Auto-tuning module 626 may perform the auto-tuning process described above with reference to FIG. 5. Auto-tuning module 626 may receive data from inference engine 416, and may operate, in conjunction with asymmetric quantization module 414 and per-input channel quantization module 415, to apply alternative precisions, etc. in running the tests, and in applying model updates once the testing is complete.

Quantization metrics may be used to determine performance of the inference model or inference engine, such as via evaluating accuracy. For example, quantization metrics may be incorporated as part of the mixed-precision auto-tuning process described above. In a design (e.g., post-training) phase, a validation dataset may be used as part of the evaluation or testing of an inference neural network model. However, in production or deployment, a validation dataset may not be available as part of the evaluation or testing of the inference model. Accordingly, another metric, optimal mean squared error (OMSE) may be used to evaluate or test an inference model in production or deployment, and may also be used during the design process. OMSE may be calculated to indicate differences between integer quantization (e.g., signed/unsigned int8), as described above, and floating point representation (e.g., fp32).

It may be assumed or understood that the data distribution follows a Laplace distribution, which is a typical normal distribution in neural networks such as DNNs. Let x be a fp32 precision random variable with a probability density function $f(x)$. Without loss of generality, it may be assumed or understood that a prepossessing step has been performed so that the average value in the tensor is zero, e.g.:

$$\overline{X} = \mu = 0.$$

For int8 quantization, the tensor values may be quantized uniformly to 256 discrete values from 0 to 255. An optimized max u for a fp32 tensor may be computed by quantization algorithm. For any $x \in \mathbb{R}$, , the clipping function clip(x,α) may be defined as follows:

$$clip(x, \alpha) = \begin{cases} x & \text{if} |x| \le \alpha \\ \text{sign}(x)\alpha & \text{if} |x| > \alpha \end{cases} \quad (14)$$

A quantization step A between two adjacent quantized values may be established as Δ=2α/256, and the OMSE between x and its quantized version Q(x) may be determined according to the following formula:

$$OMSE = E\left[(x - Q(x))^2\right] = \int_{-\infty}^{-\alpha} f(x) * (x + \alpha)^2 dx + \quad (15)$$
$$\sum_{i=0}^{255} \int_{-\alpha+i*\Delta}^{-\alpha+(i+1)*\Delta} f(x) * (x - q_i)^2 dx + \int_{\alpha}^{\infty} f(x) * (x - \alpha)^2 dx$$

This formulation for OMSE was evaluated against mean average precision (mAP) and the results tabulated in table 1 below. For the OMSE evaluation, a DNN model, SSD-MobileNetV1 (from MLPerf inference track, a performance benchmark), was used. Quantization was applied as described above, and a tuning process as described above was employed to provide a series of sample test runs. The results are summarized in Table 1 below:

| # | mAP | omse |
|---|---|---|
| 1 | 70.88% | 0.098 |
| 2 | 71.65% | 0.094 |
| 3 | 71.09% | 0.099 |
| 4 | 71.29% | 0.125 |
| 5 | 71.12% | 0.141 |
| 6 | 71.22% | 0.095 |
| 7 | 71.04% | 0.100 |
| 8 | 71.01% | 0.099 |
| 9 | 71.38% | 0.101 |
| 10 | 71.37% | 0.137 |
| 11 | 71.32% | 0.100 |
| 12 | 71.16% | 0.106 |
| 13 | 71.10% | 0.100 |
| 14 | 71.45% | 0.139 |
| 15 | 71.14% | 0.113 |
| 16 | 71.10% | 0.135 |
| 17 | 71.26% | 0.099 |
| 18 | 71.54% | 0.112 |
| 19 | 71.03% | 0.102 |

-continued

| # | mAP | omse |
|---|---|---|
| 20 | 71.35% | 0.104 |
| 21 | 71.05% | 0.112 |
| 22 | 71.21% | 0.114 |
| 23 | 71.19% | 0.099 |
| 24 | 71.42% | 0.130 |
| 25 | 71.12% | 0.106 |
| 26 | 71.04% | 0.100 |
| 27 | 71.33% | 0.125 |
| 28 | 71.20% | 0.095 |
| 29 | 70.98% | 0.111 |
| 30 | 70.98% | 0.127 |

Shown in Table 1 are a set of numbers with the following headings:

—represents the sample test run number (ranging from 1 through 30)

mAP—represents evaluation according to mAP criteria using a validation dataset omse—represents evaluation according to OMSE process, described above, using calibration images as the input data set A higher mAP % (score) represents better performance, while a lower OMSE value (score) represents better performance. For example, test run number 1 had evaluation results mAP=70.88%, and OMSE=0.098; test run number 2 had evaluation results mAP=71.65%, and OMSE=0.094; and test run number 3 had evaluation results mAP=71.09%, and OMSE=0.099. The evaluation results for OMSE roughly tracked the results for mAP, such that test runs with better OMSE performance also had, in many (though not all) instances, better mAP performance. For example, test run number 2 had the best performance under both mAP and OMSE metrics. Accordingly, the results demonstrate that the OMSE evaluation process described above is an effective way to evaluate performance of a quantized inference neural network model.

FIG. 7 is a flowchart illustrating a method 710 for optimizing an inference neural network model according to one or more embodiments, with reference to components and features described herein including but not limited to the figures and associated description.

At block 712, a quantized neural network may be generated, wherein model weights of the neural network may be quantized as signed integer values, and wherein an input layer of the neural network may be configured to quantize input values as unsigned integer values.

At block 714, a weights accumulation table may be generated based on the quantized model weights and a kernel size for the neural network.

At block 716, an output restoration function may be generated based on the weights accumulation table and the kernel size.

In some embodiments, at block 722, a mapping between output coordinates for the output layer and indices for the weights accumulation table may be generated. The mapping may be determined as described above with reference to FIGS. 2A-2C.

In some embodiments, method 710 may additionally or alternatively implement aspects of per-input channel quantization, described above with reference to FIGS. 3A-3B and 4. At block 732, input values may be quantized on a per-channel basis, which may be implemented via configuring an input layer of the neural network. At block 734, model weights of the neural network may be quantized on a per-channel basis.

In some embodiments, at block 742, the system may additionally or alternatively perform an auto-tuning procedure. The auto-tuning procedure may include some or all aspects of mixed-precision auto-tuning, described above with reference to FIGS. 5 and 6A-6B.

The system and methods described above with reference to FIGS. 1-7 (inclusive) may be implemented in any number of ways, including hardware (such as, e.g., a processor) executing software instructions. As one example, in one or more embodiments the system and methods described above with reference to FIGS. 1-7 (inclusive) may be implemented via one or more Intel® Xeon® scalable processors executing software instructions. Intel® Xeon® scalable processors may include hardware acceleration support with Intel® Deep Learning (DL) Boost (which includes an extended instruction set for integer operations).

Figure 8:
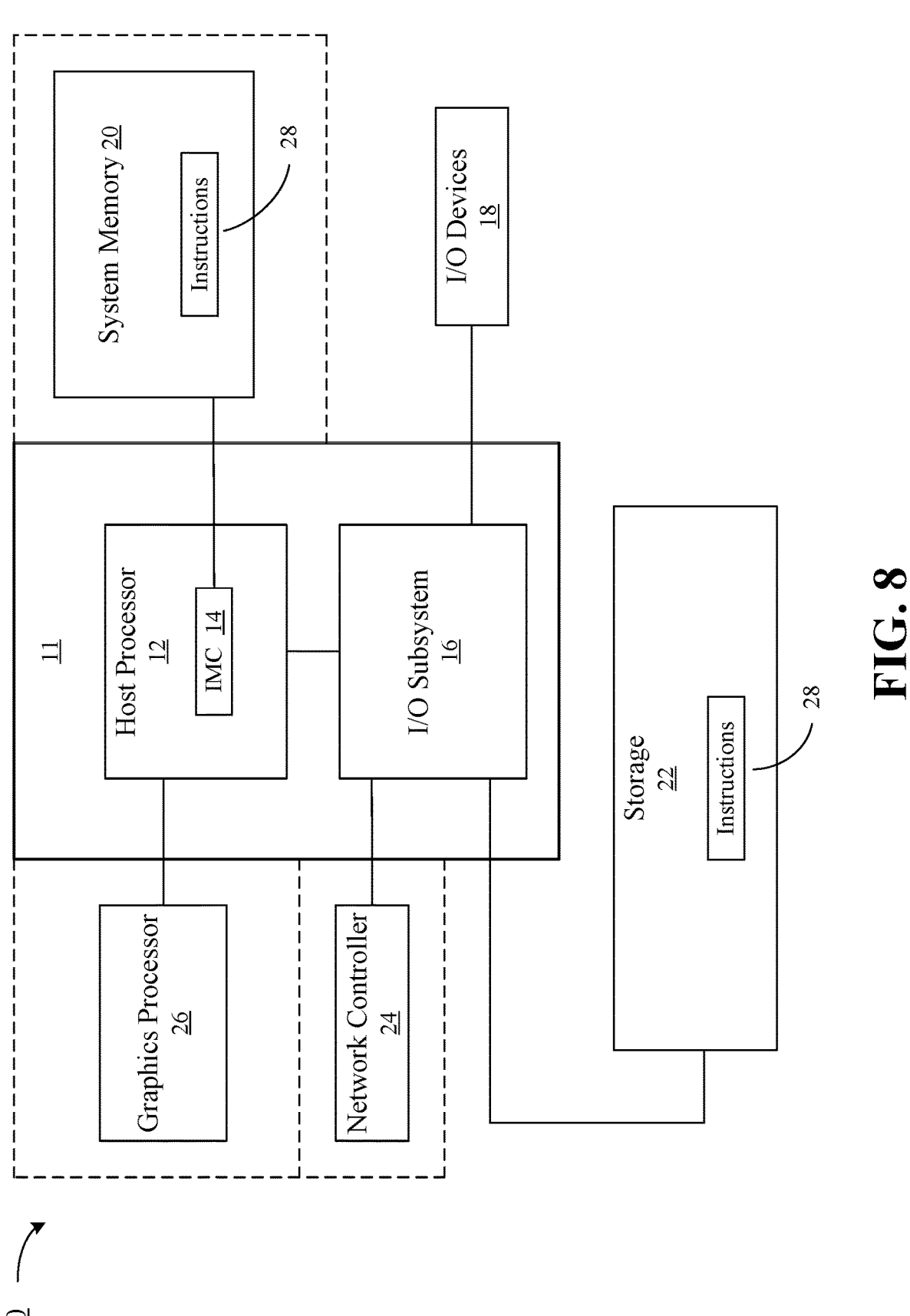
FIG. 8 provides a block diagram illustrating an example system for optimizing an inference neural network model according to one or more embodiments.

FIG. 8 shows a block diagram illustrating an example computing system 10 for optimizing an inference neural network model according to one or more embodiments, with reference to components and features described herein including but not limited to the figures and associated description. System 10 may generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, system 10 may include a host processor 12 (e.g., central processing unit/CPU) having an integrated memory controller (IMC) 14 that may be coupled to system memory 20. Host processor 12 may include any type of processing device, such as, e.g., microcontroller, microprocessor, RISC processor, ASIC, etc., along with associated processing modules or circuitry. System memory 20 may include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

System 10 may also include an input/output (I/O) subsystem 16. I/O subsystem 16 may communicate with for example, one or more input/output (I/O) devices 18, a network controller 24 (e.g., wired and/or wireless NIC), and storage 22. Storage 22 may be comprised of any appropriate non-transitory machine- or computer-readable memory type (e.g., flash memory, DRAM, SRAM (static random access memory), solid state drive (SSD), hard disk drive (HDD), optical disk, etc.). Storage 22 may include mass storage. In some embodiments, host processor 12 and/or I/O subsystem 16 may communicate with storage 22 (all or portions thereof) via network controller 24. In some embodiments, system 10 may also include a graphics processor 26.

Host processor 12, I/O subsystem 16 and/or graphics processor 26 may execute program instructions 28 retrieved from system memory 20 and/or storage 22 to perform one or more aspects of the processes described above, including processes for asymmetric quantization described herein with reference to FIGS. 1 and 2A-2C, processes for per-input channel quantization described herein with reference to FIGS. 3A-3B and 4, and processes for mixed precision auto-tuning described herein with reference to FIGS. 5 and 6A-6B. Host processor 12 and/or I/O subsystem 16 may execute program instructions 28 retrieved from system memory 20 and/or storage 22 to perform one or more aspects of the processes for optimizing an inference neural network model described herein with reference to FIG. 7.

Computer program code to carry out the processes described above may be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

Host processor 12 and I/O subsystem 16 may be implemented together on a semiconductor die as a system on chip (SoC) 11, shown encased in a solid line. SoC 11 may therefore operate as a computing apparatus for optimizing an inference model. In some embodiments, SoC 11 may also include one or more of system memory 20, network controller 24, and/or graphics processor 26 (shown encased in dotted lines).

I/O devices 18 may include one or more of input devices, such as a touch-screen, keyboard, mouse, cursor-control device, touch-screen, microphone, digital camera, video recorder, camcorder, biometric scanners and/or sensors; input devices may be used to enter information and interact with system 10 and/or with other devices. I/O devices 18 may also include one or more of output devices, such as a display (e.g., touch screen, liquid crystal display/LCD, light emitting diode/LED display, plasma panels, etc.), speakers and/or other visual or audio output devices. Input and/or output devices may be used, e.g., to provide a user interface.

Figure 9:
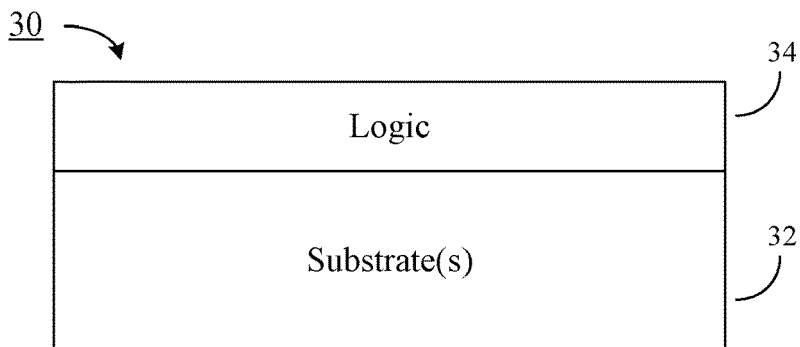
FIG. 9 is a block diagram illustrating an example semiconductor apparatus for optimizing an inference neural network model according to one or more embodiments.

FIG. 9 shows a block diagram illustrating an example semiconductor apparatus 30 for optimizing an inference neural network model according to one or more embodiments, with reference to components and features described herein including but not limited to the figures and associated description. Semiconductor apparatus 30 may be implemented, e.g., as a chip, die, or other semiconductor package. Semiconductor apparatus 30 may include one or more substrates 32 comprised of, e.g., silicon, sapphire, gallium arsenide, etc. Semiconductor apparatus 30 may also include logic 34 comprised of, e.g., transistor array(s) and other integrated circuit (IC) components) coupled to the substrate(s) 32. Logic 34 may implement system on chip (SoC) 11 described above with reference to FIG. 8. Logic 34 may implement one or more aspects of the processes described above, including processes for asymmetric quantization described herein with reference to FIGS. 1 and 2A-2C, processes for per-input channel quantization described herein with reference to FIGS. 3A-3B and 4, and processes for mixed precision auto-tuning described herein with reference to FIGS. 5 and 6A-6B. Logic 34 may implement one or more aspects of the processes for optimizing an inference neural network model described herein with reference to FIG. 7.

Semiconductor apparatus 30 may be constructed using any appropriate semiconductor manufacturing processes or techniques. Logic 34 may be implemented at least partly in configurable logic or fixed-functionality hardware logic. For example, logic 34 may include transistor channel regions that are positioned (e.g., embedded) within substrate(s) 32. Thus, the interface between logic 34 and substrate(s) 32 may not be an abrupt junction. Logic 34 may also be considered to include an epitaxial layer that is grown on an initial wafer of substrate(s) 34.

Figure 10:
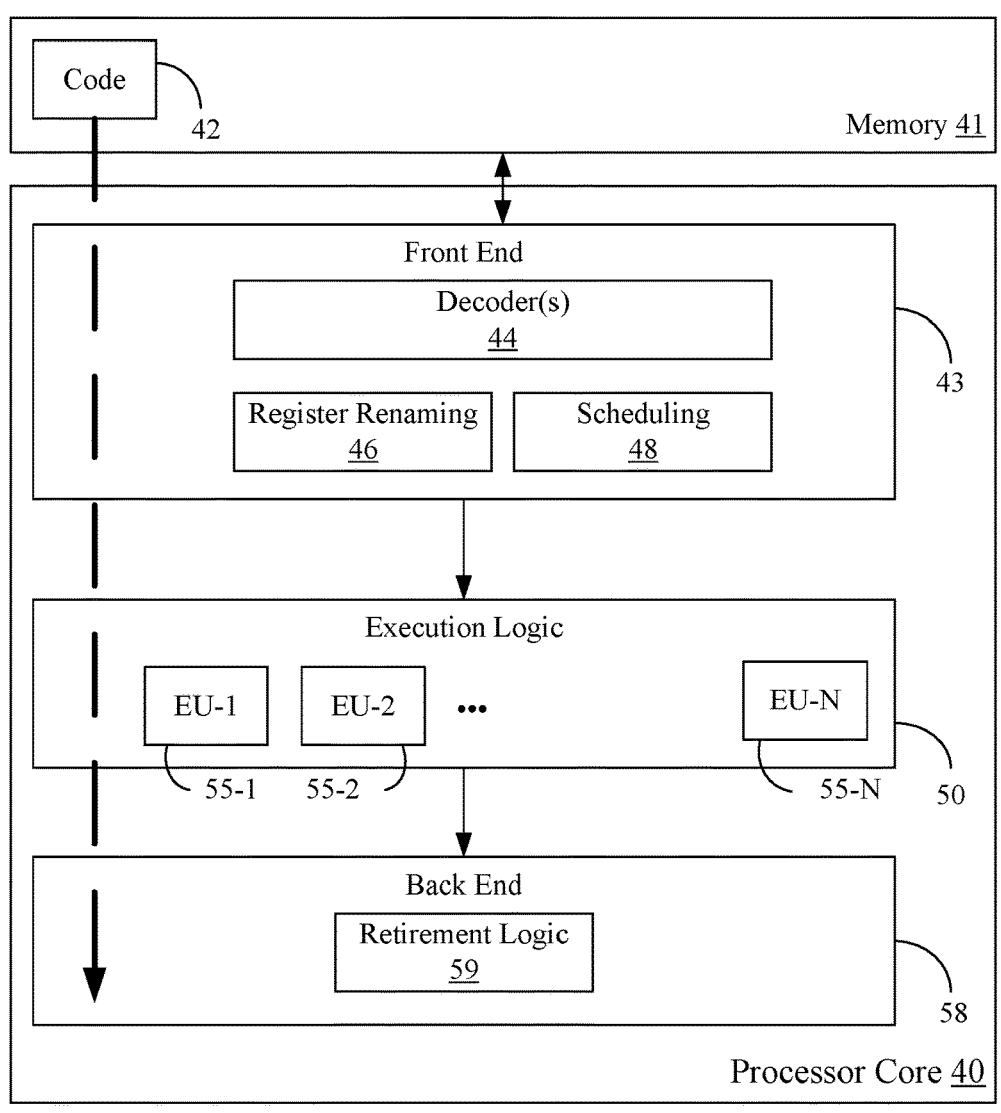
FIG. 10 is a block diagram illustrating an example processor according to one or more embodiments.

FIG. 10 is a block diagram illustrating an example processor core 40 according to one or more embodiments, with reference to components and features described herein including but not limited to the figures and associated description. Processor core 40 may be the core for any type of processor, such as a micro-processor, an embedded processor, a digital signal processor (DSP), a network processor, or other device to execute code. Although only one processor core 40 is illustrated in FIG. 10, a processing element may alternatively include more than one of the processor core 40 illustrated in FIG. 10. Processor core 40 may be a single-threaded core or, for at least one embodiment, processor core 40 may be multithreaded in that it may include more than one hardware thread context (or "logical processor") per core.

FIG. 10 also illustrates a memory 41 coupled to processor core 40. Memory 41 may be any of a wide variety of memories (including various layers of memory hierarchy) as are known or otherwise available to those of skill in the art. Memory 41 may include one or more code 42 instruction(s) to be executed by processor core 40. Code 42 may implement one or more aspects of the processes described above, including processes for asymmetric quantization described herein with reference to FIGS. 1 and 2A-2C, processes for per-input channel quantization described herein with reference to FIGS. 3A-3B and 4, and processes for mixed precision auto-tuning described herein with reference to FIGS. 5 and 6A-6B. Code 42 may implement one or more aspects of the processes for optimizing an inference neural network model described herein with reference to FIG. 7. Processor core 40 follows a program sequence of instructions indicated by code 42. Each instruction may enter a front end portion 43 and be processed by one or more decoders 44. Decoder 44 may generate as its output a micro operation such as a fixed width micro operation in a predefined format, or may generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

Processor core 40 is shown including execution logic 50 having a set of execution units 55-1 through 55-N. Some embodiments may include a number of execution units dedicated to specific functions or sets of functions. Other embodiments may include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 may take a variety of forms as known to those of skill in the art (e.g., re-order buffers or the like). In this manner, processor core 40 is transformed during execution of code 42, at least in terms of the output generated by the decoder, the hardware registers and tables utilized by the register renaming logic 46, and any registers (not shown) modified by the execution logic 50.

Although not illustrated in FIG. 10, a processing element may include other elements on chip with processor core 40. For example, a processing element may include memory control logic along with processor core 40. The processing element may include I/O control logic and/or may include I/O control logic integrated with memory control logic. The processing element may also include one or more caches.

Figure 11:
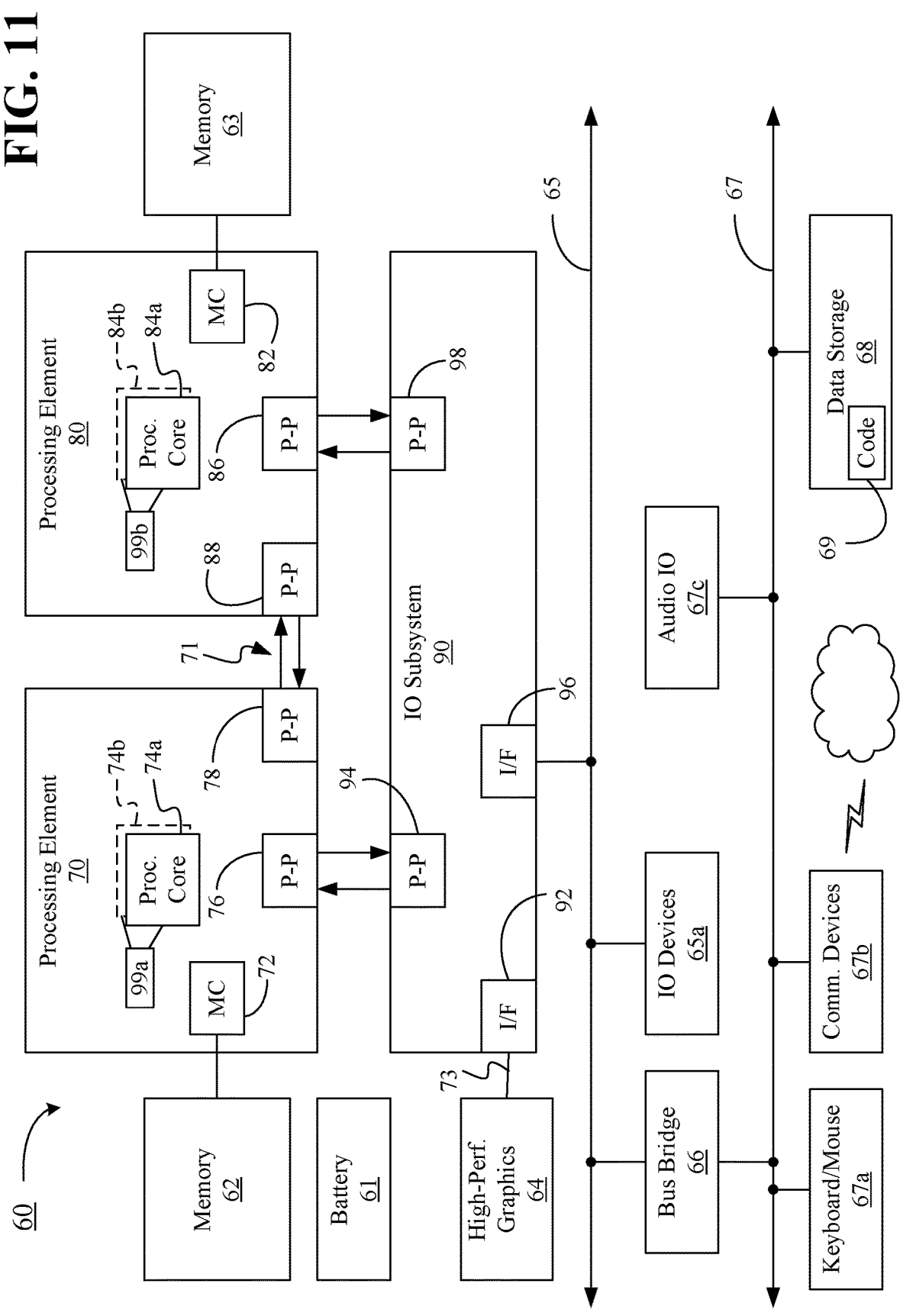
FIG. 11 is a block diagram illustrating an example of a multi-processor based computing system according to one or more embodiments.

FIG. 11 is a block diagram illustrating an example of a multi-processor based computing system 60 according to one or more embodiments, with reference to components and features described herein including but not limited to the figures and associated description. Multiprocessor system 60 includes a first processing element 70 and a second processing element 80. While two processing elements 70 and 80 are shown, it is to be understood that an embodiment of the system 60 may also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 11 may be implemented as a multi-drop bus rather than point-to-point interconnect.

As shown in FIG. 11, each of processing elements 70 and 80 may be multicore processors, including first and second processor cores (i.e., processor cores 74a and 74b and processor cores 84a and 84b). Such cores 74a, 74b, 84a, 84b may be configured to execute instruction code in a manner similar to that discussed above in connection with FIG. 10.

Each processing element 70, 80 may include at least one shared cache 99a, 99b. The shared cache 99a, 99b may store data (e.g., instructions) that are utilized by one or more components of the processor, such as the cores 74a, 74b and 84a, 84b, respectively. For example, the shared cache 99a, 99b may locally cache data stored in a memory 62, 63 for faster access by components of the processor. In one or more embodiments, the shared cache 99a, 99b may include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments are not so limited. In other embodiments, one or more additional processing elements may be present in a given processor. Alternatively, one or more of processing elements 70, 80 may be an element other than a processor, such as an accelerator or a field programmable gate array. For example, additional processing element(s) may include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences may effectively manifest themselves as asymmetry and heterogeneity amongst the processing elements 70, 80. For at least one embodiment, the various processing elements 70, 80 may reside in the same die package.

The first processing element 70 may further include memory controller logic (MC) 72 and point-to-point (P-P) interfaces 76 and 78. Similarly, the second processing element 80 may include a MC 82 and P-P interfaces 86 and 88. As shown in FIG. 11, MC's 72 and 82 couple the processors to respective memories, namely a memory 62 and a memory 63, which may be portions of main memory locally attached to the respective processors. While the MC 72 and 82 is illustrated as integrated into the processing elements 70, 80, for alternative embodiments the MC logic may be discrete logic outside the processing elements 70, 80 rather than integrated therein.

The first processing element 70 and the second processing element 80 may be coupled to an I/O subsystem 90 via P-P interconnects 76 and 86, respectively. As shown in FIG. 11, the I/O subsystem 90 includes P-P interfaces 94 and 98. Furthermore, I/O subsystem 90 includes an interface 92 to couple I/O subsystem 90 with a high performance graphics engine 64. In one embodiment, bus 73 may be used to couple the graphics engine 64 to the I/O subsystem 90. Alternately, a point-to-point interconnect may couple these components.

In turn, I/O subsystem 90 may be coupled to a first bus 65 via an interface 96. In one embodiment, the first bus 65 may be a Peripheral Component Interconnect (PCI) bus, or a bus such as a PCI Express bus or another third generation I/O interconnect bus, although the scope of the embodiments are not so limited.

As shown in FIG. 11, various I/O devices 65*a* (e.g., biometric scanners, speakers, cameras, sensors) may be coupled to the first bus 65, along with a bus bridge 66 which may couple the first bus 65 to a second bus 67. In one embodiment, the second bus 67 may be a low pin count (LPC) bus. Various devices may be coupled to the second bus 67 including, for example, a keyboard/mouse 67*a*, communication device(s) 67*b*, and a data storage unit 68 such as a disk drive or other mass storage device which may include code 69, in one embodiment. The illustrated code 69 may implement one or more aspects of the processes described above, including processes for asymmetric quantization described herein with reference to FIGS. 1 and 2A-2C, processes for per-input channel quantization described herein with reference to FIGS. 3A-3B and 4, and processes for mixed precision auto-tuning described herein with reference to FIGS. 5 and 6A-6B. Code 69 may implement one or more aspects of the processes for optimizing an inference neural network model described herein with reference to FIG. 7. The illustrated code 69 may be similar to the code 42 (FIG. 10), already discussed. Further, an audio I/O 67*c* may be coupled to second bus 67 and a battery 61 may supply power to the computing system 60.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Each of the systems and methods described above, and each of the embodiments (including implementations) thereof, for optimizing an inference neural network model may be considered performance-enhancing, at least to the extent that an inference neural network model may include low-precision asymmetric quantization, as described herein, and provide suitably optimized performance for deployment in any possible number of environments, including those having limited computational and/or memory capability. Advantages of the technology described herein include increased computational efficiency (e.g., greater number of operations per second), reduced memory access and reduced memory requirements, improved use of memory cache, all resulting in higher throughput and lower latency.

ADDITIONAL NOTES AND EXAMPLES

Example 1 includes a computing system for optimizing an inference neural network model comprising a processor and a memory coupled to the processor, the memory including a set of instructions which, when executed by the processor, cause the computing system to generate a quantized neural network, wherein model weights of the neural network are quantized as signed integer values, and wherein an input layer of the neural network is configured to quantize input values as unsigned integer values, generate a weights accumulation table based on the quantized model weights and a kernel size for the neural network, and generate an output restoration function for an output layer of the neural network based on the weights accumulation table and the kernel size.

Example 2 includes the computing system of Example 1, wherein to generate an output restoration function, the instructions, when executed, cause the computing system to generate a mapping between output coordinates for the output layer of the neural network and indices for the weights accumulation table.

Example 3 includes the computing system of Example 1, wherein the input layer of the neural network is configured to quantize input values on a per-channel basis, and the model weights of the neural network are quantized on a per-channel basis.

Example 4 includes the computing system of Example 3, wherein the weights accumulation table comprises a third dimension, the values of each respective tier of the third dimension corresponding to each respective channel.

Example 5 includes the computing system of Example 1, wherein the neural network includes a plurality of inner layers, and wherein the weights accumulation table is generated based on a plurality of per-layer weights accumulation tables, each per-layer weights accumulation table corresponding to one of the plurality of inner layers of the neural network.

Example 6 includes the computing system of any one of Examples 1 to 5, wherein the instructions, when executed, further cause the computing system to perform an auto-tuning procedure, the auto-tuning procedure incorporating quantization metrics.

Example 7 includes a semiconductor apparatus for optimizing an inference neural network model, comprising one or more substrates, and logic coupled to the one or more substrates, wherein the logic is implemented at least partly in one or more of configurable logic or fixed-functionality hardware logic, the logic coupled to the one or more substrates to generate a quantized neural network, wherein model weights of the neural network are quantized as signed integer values, and wherein an input layer of the neural network is configured to quantize input values as unsigned integer values, generate a weights accumulation table based on the quantized model weights and a kernel size for the neural network, and generate an output restoration function for an output layer of the neural network based on the weights accumulation table and the kernel size.

Example 8 includes the semiconductor apparatus of Example 7, wherein to generate an output restoration function, the logic coupled to the one or more substrates is to generate a mapping between output coordinates for the output layer of the neural network and indices for the weights accumulation table.

Example 9 includes the semiconductor apparatus of Example 7, wherein the input layer of the neural network is configured to quantize input values on a per-channel basis, and the model weights of the neural network are quantized on a per-channel basis.

Example 10 includes the semiconductor apparatus of Example 9, wherein the weights accumulation table comprises a third dimension, the values of each respective tier of the third dimension corresponding to each respective channel.

Example 11 includes the semiconductor apparatus of Example 7, wherein the neural network includes a plurality of inner layers, and wherein the weights accumulation table is generated based on a plurality of per-layer weights accumulation tables, each per-layer weights accumulation table corresponding to one of the plurality of inner layers of the neural network.

Example 12 includes the semiconductor apparatus of any one of Examples 7 to 11, wherein the logic coupled to the one or more substrates is further to perform an auto-tuning procedure, the auto-tuning procedure incorporating quantization metrics.

Example 13 includes at least one non-transitory computer readable storage medium comprising a set of instructions for optimizing an inference neural network model which, when executed by a computing system, cause the computing system to generate a quantized neural network, wherein model weights of the neural network are quantized as signed integer values, and wherein an input layer of the neural network is configured to quantize input values as unsigned integer values, generate a weights accumulation table based on the quantized model weights and a kernel size for the neural network, and generate an output restoration function for an output layer of the neural network based on the weights accumulation table and the kernel size.

Example 14 includes the at least one non-transitory computer readable storage medium of Example 13, wherein to generate an output restoration function, the instructions, when executed, cause the computing system to generate a mapping between output coordinates for the output layer of the neural network and indices for the weights accumulation table.

Example 15 includes the at least one non-transitory computer readable storage medium of Example 14, wherein the input layer of the neural network is configured to quantize input values on a per-channel basis, and the model weights of the neural network are quantized on a per-channel basis.

Example 16 includes the at least one non-transitory computer readable storage medium of Example 15, wherein the weights accumulation table comprises a third dimension, the values of each respective tier of the third dimension corresponding to each respective channel.

Example 17 includes the at least one non-transitory computer readable storage medium of Example 13, wherein the neural network includes a plurality of inner layers, and wherein the weights accumulation table is generated based on a plurality of per-layer weights accumulation tables, each per-layer weights accumulation table corresponding to one of the plurality of inner layers of the neural network.

Example 18 includes the at least one non-transitory computer readable storage medium of any one of Examples 13 to 17, wherein the instructions, when executed, further cause the computing system to perform an auto-tuning procedure, the auto-tuning procedure incorporating quantization metrics.

Example 19 includes a method of operating a computing apparatus for optimizing an inference neural network model, comprising generating a quantized neural network, wherein model weights of the neural network are quantized as signed integer values, and wherein an input layer of the neural network is configured to quantize input values as unsigned integer values, generating a weights accumulation table based on the quantized model weights and a kernel size for the neural network, and generating an output restoration function for an output layer of the neural network based on the weights accumulation table and the kernel size.

Example 20 includes the method of Example 19, wherein generating an output restoration function comprises generating a mapping between output coordinates for the output layer of the neural network and indices for the weights accumulation table.

Example 21 includes the method of Example 20, wherein the input layer of the neural network is configured to quantize input values on a per-channel basis, and the model weights of the neural network are quantized on a per-channel basis.

Example 22 includes the method of Example 21, wherein the weights accumulation table comprises a third dimension, the values of each respective tier of the third dimension corresponding to each respective channel.

Example 23 includes the method of Example 19, wherein the neural network includes a plurality of inner layers, and wherein the weights accumulation table is generated based on a plurality of per-layer weights accumulation tables, each per-layer weights accumulation table corresponding to one of the plurality of inner layers of the neural network Example 24 includes the method of any one of Examples 19 to 23, further comprising performing an auto-tuning procedure, the auto-tuning procedure incorporating quantization metrics.

Example 25 includes an apparatus comprising means for performing the method of any one of claims 19-24.

Thus, technology described herein improves the performance of inference neural networks through asymmetric quantization, by generating a quantized neural network, wherein model weights of the neural network are quantized as signed integer values, and wherein an input layer of the neural network is configured to quantize input values as unsigned integer values, generating a weights accumulation table based on the quantized model weights and a kernel size for the neural network, and generating an output restoration function for an output layer of the neural network based on the weights accumulation table and the kernel size. The technology may also perform per-input channel quantization, and may also perform mixed-precision auto-tuning. The technology described herein may be applicable in any number of computing environments, including servers, cloud computing, browsers, and/or any environment having a deployed inference neural network.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a processor; and
a memory coupled to the processor, the memory including a set of instructions which, when executed by the processor, cause the computing system to:
generate a quantized neural network, wherein model weights of the neural network are symmetrically quantized as signed integer values, and wherein an input layer of the neural network is configured to asymmetrically quantize input values as unsigned integer values;
generate a weights accumulation table based on the quantized model weights and a kernel size for the neural network, wherein the weights accumulation table bis an accumulation of integer weights within a range of kernel indices; and
generate an output restoration function for an output layer of the neural network based on the weights accumulation table, convolution result, and the kernel size.

2. The computing system of claim 1, wherein to generate an output restoration function, the instructions, when executed, cause the computing system to generate a mapping between output coordinates for the output layer of the neural network and indices for the weights accumulation table.

3. The computing system of claim 1, wherein:
the input layer of the neural network is configured to quantize input values on a per-channel basis, and
the model weights of the neural network are quantized on a per-channel basis.

4. The computing system of claim 3, wherein the weights accumulation table comprises a third dimension, the values of each respective tier of the third dimension corresponding to each respective channel.

5. The computing system of claim 1, wherein the neural network includes a plurality of inner layers, and wherein the weights accumulation table is generated based on a plurality of per-layer weights accumulation tables, each per-layer weights accumulation table corresponding to one of the plurality of inner layers of the neural network.

6. The computing system of claim 1, wherein the instructions, when executed, further cause the computing system to perform an auto-tuning procedure, the auto-tuning procedure incorporating quantization metrics.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
generate a quantized neural network, wherein model weights of the neural network are symmetrically quantized as signed integer values, and wherein an input layer of the neural network is configured to asymmetrically quantize input values as unsigned integer values;
generate a weights accumulation table based on the quantized model weights and a kernel size for the neural network, wherein the weights accumulation table bis an accumulation of integer weights within a range of kernel indices; and
generate an output restoration function for an output layer of the neural network based on the weights accumulation table, convolution result, and the kernel size.

8. The semiconductor apparatus of claim 7, wherein to generate an output restoration function, the logic coupled to the one or more substrates is to generate a mapping between output coordinates for the output layer of the neural network and indices for the weights accumulation table.

9. The semiconductor apparatus of claim 7, wherein:
the input layer of the neural network is configured to quantize input values on a per-channel basis, and the model weights of the neural network are quantized on a per-channel basis.

10. The semiconductor apparatus of claim 9, wherein the weights accumulation table comprises a third dimension, the values of each respective tier of the third dimension corresponding to each respective channel.

11. The semiconductor apparatus of claim 7, wherein the neural network includes a plurality of inner layers, and wherein the weights accumulation table is generated based on a plurality of per-layer weights accumulation tables, each per-layer weights accumulation table corresponding to one of the plurality of inner layers of the neural network.

12. The semiconductor apparatus of claim 7, wherein the logic coupled to the one or more substrates is further to perform an auto-tuning procedure, the auto-tuning procedure incorporating quantization metrics.

13. The semiconductor apparatus of claim 7, wherein the logic coupled to the one or more substrates includes transistor channel regions that are positioned within the one or more substrates.

14. At least one non-transitory computer readable storage medium comprising a set of instructions for managing a runtime computing environment which, when executed by a computing system, cause the computing system to:

generate a quantized neural network, wherein model weights of the neural network are symmetrically quantized as signed integer values, and wherein an input layer of the neural network is configured to quantize input values as asymmetrically unsigned integer values;

generate a weights accumulation table based on the quantized model weights and a kernel size for the neural network, wherein the weights accumulation table bis an accumulation of integer weights within a range of kernel indices; and generate an output restoration function for an output layer of the neural network based on the weights accumulation table, convolution result, and the kernel size.

15. The at least one non-transitory computer readable storage medium of claim 14, wherein to generate an output restoration function, the instructions, when executed, cause the computing system to generate a mapping between output coordinates for the output layer of the neural network and indices for the weights accumulation table.

16. The at least one non-transitory computer readable storage medium of claim 14, wherein:

the input layer of the neural network is configured to quantize input values on a per-channel basis, and the model weights of the neural network are quantized on a per-channel basis.

17. The at least one non-transitory computer readable storage medium of claim 16, wherein the weights accumulation table comprises a third dimension, the values of each respective tier of the third dimension corresponding to each respective channel.

18. The at least one non-transitory computer readable storage medium of claim 14, wherein the neural network includes a plurality of inner layers, and wherein the weights accumulation table is generated based on a plurality of per-layer weights accumulation tables, each per-layer weights accumulation table corresponding to one of the plurality of inner layers of the neural network.

19. The at least one non-transitory computer readable storage medium of claim 14, wherein the instructions, when executed, further cause the computing system to perform an auto-tuning procedure, the auto-tuning procedure incorporating quantization metrics.

20. A method comprising:

generating a quantized neural network, wherein model weights of the neural network are symmetrically quantized as signed integer values, and wherein an input layer of the neural network is configured to quantize input values as asymmetrically unsigned integer values;

generating a weights accumulation table based on the quantized model weights and a kernel size for the neural network, wherein the weights accumulation table bis an accumulation of integer weights within a range of kernel indices; and generating an output restoration function for an output layer of the neural network based on the weights accumulation table, convolution result, and the kernel size.

21. The method of claim 20, wherein generating an output restoration function comprises generating a mapping between output coordinates for the output layer of the neural network and indices for the weights accumulation table.

22. The method of claim 20, wherein:

the input layer of the neural network is configured to quantize input values on a per-channel basis, and the model weights of the neural network are quantized on a per-channel basis.

23. The method of claim 22, wherein the weights accumulation table comprises a third dimension, the values of each respective tier of the third dimension corresponding to each respective channel.

24. The method of claim 20, wherein the neural network includes a plurality of inner layers, and wherein the weights accumulation table is generated based on a plurality of per-layer weights accumulation tables, each per-layer weights accumulation table corresponding to one of the plurality of inner layers of the neural network.

25. The method of claim 20, further comprising performing an auto-tuning procedure, the auto-tuning procedure incorporating quantization metrics.

* * * * *